United States Patent [19]

Chapman

[11] 3,993,899

[45] Nov. 23, 1976

[54] SORTING MACHINE WITH FIBER OPTIC FOCUSING MEANS

[75] Inventor: Thomas Henry Chapman, Sanderstead, England

[73] Assignee: Gunson's Sortex Limited, London, England

[22] Filed: Dec. 9, 1974

[21] Appl. No.: 531,227

[30] Foreign Application Priority Data

Dec. 13, 1973 United Kingdom.............. 57833/73

[52] U.S. Cl................................. 250/227; 250/226; 356/176; 209/111.6

[51] Int. Cl.²........................................ G02B 5/14

[58] Field of Search ........... 250/227, 226; 356/173, 356/176, 177; 209/111.6

[56] References Cited

UNITED STATES PATENTS

| | | | |
|---|---|---|---|
| 3,500,047 | 3/1970 | Berry | 250/226 |
| 3,562,539 | 2/1971 | Beroza | 250/227 |
| 3,700,960 | 10/1972 | Lake | 250/226 X |
| 3,773,172 | 11/1973 | McClure et al. | 209/111.6 X |
| 3,885,878 | 5/1975 | Ishak | 356/176 |

*Primary Examiner*—Eli Lieberman
*Assistant Examiner*—David K. Moore
*Attorney, Agent, or Firm*—McGarry & Waters

[57] ABSTRACT

A light splitter device adapted for use in a light-sensitive sorting machine comprising a multiplicity of optical fibers adjacent ends of which extend from a common surface, the opposite ends of the fibers being disposed in a plurality of separate groups of fibers which are respectively adapted to illuminate different light sensors, the fibers of each group respectively extending from regions distributed substantially uniformly throughout the said common surface.

13 Claims, 9 Drawing Figures

SORTING MACHINE WITH FIBER OPTIC FOCUSING MEANS

Figure 1:
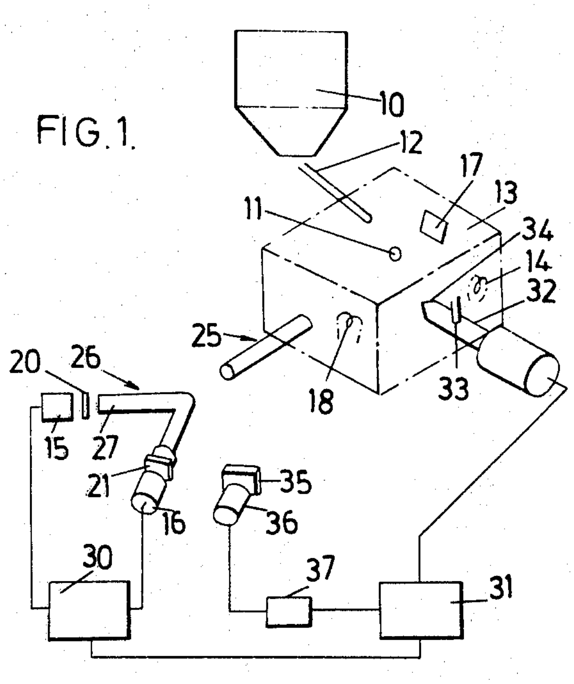

This invention concerns a light splitter device used in a light-sensitive sorting machine.

According to the present invention, there is provided a light-sensitive sorting machine comprising a plurality of light sensors which are respectively responsive to light of different colours emanating from material moving through a field of view, a block, a multiplicity of optical fibres which extend through said block and adjacent ends of which extend from a common surface of said block, the opposite ends of the fibres being disposed outwardly of said block in a plurality of separate groups of fibres which respectively illuminate the light sensors responsive to the light of different colours, and focussing means for focussing light onto the common surface, the fibres of each group respectively extending from a multiplicity of spaced apart regions distributed substantially uniformly throughout the said common surface, the ratio of the amounts of light received by the different light sensors being independent of the position of the material in the field of view.

The said opposite ends of the fibres of each group may be shaped to conform closely to that of the respective light sensor or of a filter associated with the latter.

The fibres of each group may have the same total cross-sectional area, whereby each light sensor receives the same amount of light. Alternatively, if desired, different light sensors may be arranged to receive different amounts of light.

At the common surface, the adjacent ends of the fibres of the various groups may be arranged in layers, each group of fibres comprising a plurality of such layers which alternate with the layers of the other group or groups of fibres.

Alternatively, each part of the common surface may contain fibres of the various groups in the same relative proportions. The machine may have at least one sorting channel which is provided with at least one of said light sensors, the or each light sensor being arranged to pass signals to a respective comparator adapted to distinguish signals derived from desired and undesired material being sorted, the comparator producing an output signal whenever undesired material is detected by said light sensor. Thus light sensors which are responsive to light of different colours may be connected across a difference amplifier the output of which controls the said comparator.

Another of said light sensors may be constituted by a datum control light sensor which is adapted to detect the presence or absence of said material in a sorting zone of the sorting machine, the datum control light sensor being connected to the respective comparator by a circuit which ensures that the datum with respect to which the respective comparator discriminates between desired and undesired material does not change in the course of a sorting operation.

Alternatively the or each comparator may be connected to a plurality of light sensors which are respectively responsive to light of different colour, additional optical fibres being provided one end of each of which is disposed at said common surface and the other end of each of which is arranged to illuminate a datum control light sensor which is adapted to detect the presence or absence of said material in a sorting zone of the sorting machine and which is connected to the or each comparator by a circuit which ensures that the datum with respect to which the respective comparator discriminates between desired and undesired material does not change in the course of a sorting operation. In this case there may be two groups of additional optical fibres which extend from opposite sides respectively of the said common surface.

The machine may be provided with at least one channel through which may pass material to be sorted, the or each channel being illuminated by at least one quartz-iodine lamp the light from which is reflected by or transmitted through the material being sorted, the said light being directed by said focussing means onto the said common surface. The or each quartz iodine lamp is preferably not sealed from the interior of the respective channel.

The machine may be provided with a plurality of adjacent channels through which may pass material to be sorted, at least one individual lamp being mounted within each channel to illuminate the latter, and at least one further lamp being disposed at a junction or junctions between adjacent channels to illuminate each of the latter. Thus the machine may have a plurality of pairs of intercommunicating channels each intercommunicating channel of which contains at least one respective lamp some of the light from which is directed into the other intercommunicating channel, each pair of intercommunicating channels being separated from the adjacent said pair by a partition each of the opposite ends of which is partially cut away to house a said further lamp.

The or each comparator may be connected to an indicator means for visually indicating whenever the or each comparator produces an output signal. The material passing through the or each said sorting channel may be viewed from at least one viewing direction, there preferably being provided, for the or each viewing direction, two light sensors which are respectively sensitive to light of different colours and which are respectively arranged to pass signals to three said comparators, two of the comparators being monochromatic comparators which receive signals only from a respective one of said light sensors, and the other comparator being a bichromatic comparator which receives signals from both said light sensors, each comparator being connected to a respective indicator means. The or each indicator means may comprise a lamp which is directly viewable from the exterior of the machine.

The invention also comprises a light-sensitive sorting machine in which light from material passing through a sorting channel or channels of the machine is employed to effect sorting of the said material, and at least one quartz iodine lamp which is not sealed from the interior of the respective channel for illuminating the or each said channel. The machine may have a chamber having a plurality of adjacent channels through which may pass material to be sorted, at least one individual lamp being mounted within each channel to illuminate the latter, and at least one further lamp being disposed at the junction between each adjacent pair of channels to illuminate both of the latter.

Yet a further independent feature of the present invention is a light-sensitive sorting machine having at least one channel through which material to be sorted may pass, there being provided for the or each said channel means for illuminating material passing through the channel, at least one light sensor for receiving light from the material passing through the channel, the light sensor being connected to and being adapted to pass signals to a respective comparator adapted to distinguish signals derived from desired and undesired material, the or each comparator producing an output signal whenever undesired material is detected by said light sensor, and indicator means, directly viewable from the exterior of the machine, for indicating whenever the or each comparator produces an output signal.

The invention also comprises a method of setting up such a light-sensitive sorting machine, the method comprising viewing said indicator means, and adjusting the or each comparator, or the magnitude of the input signals to the or each comparator, so that, as indicated by the indicator means, desired output signals are obtained.

Figure 3:
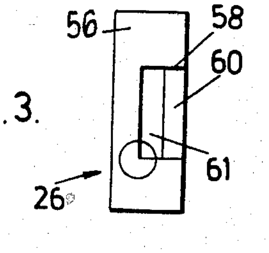
Figure 3A:
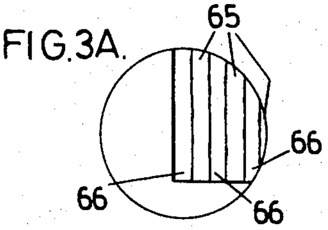
Figure 2:
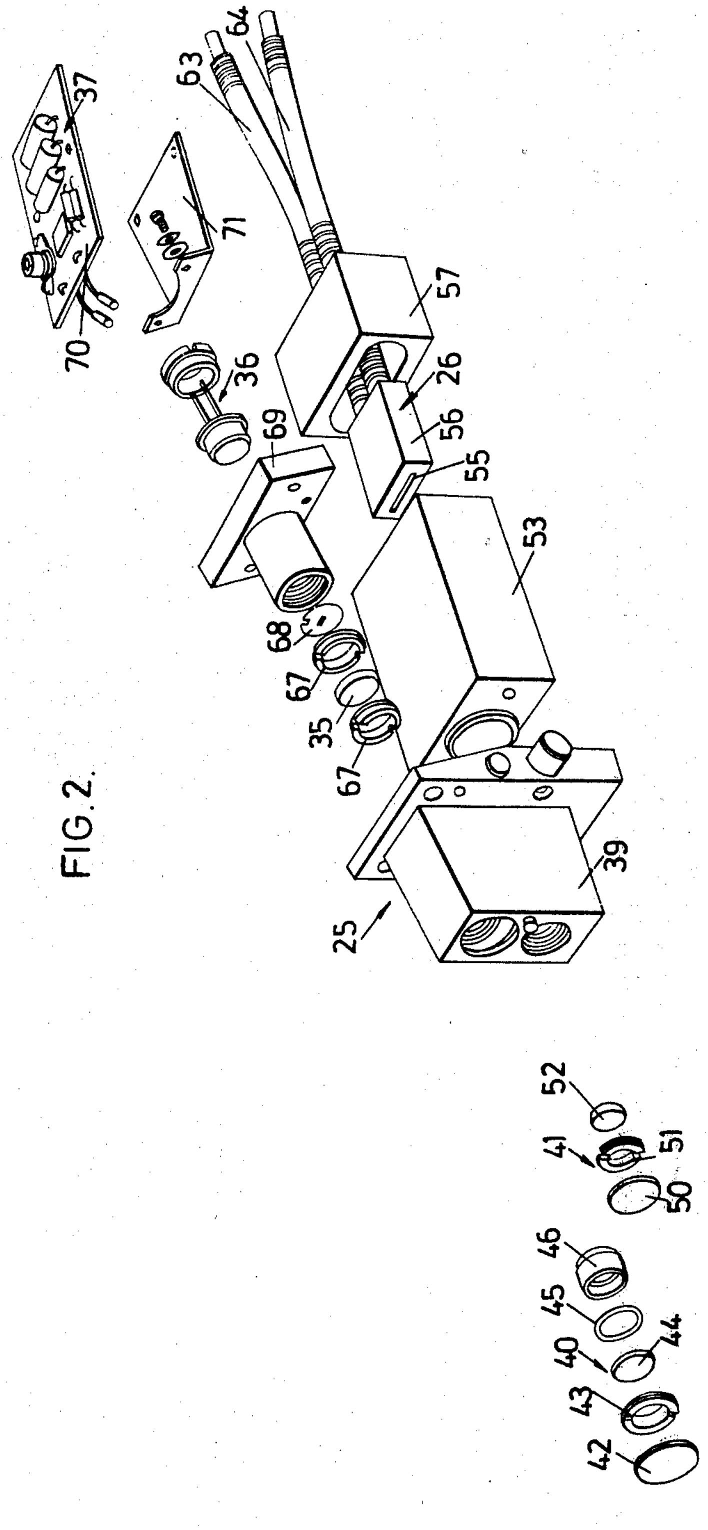
Figure 4:
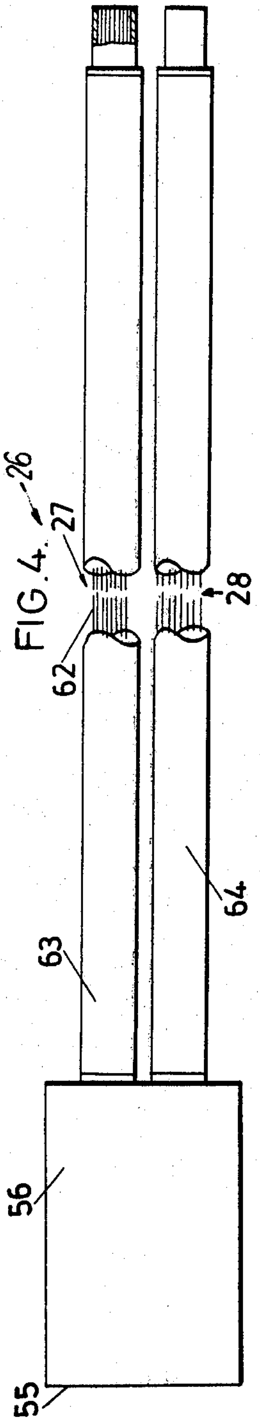
Figure 5:
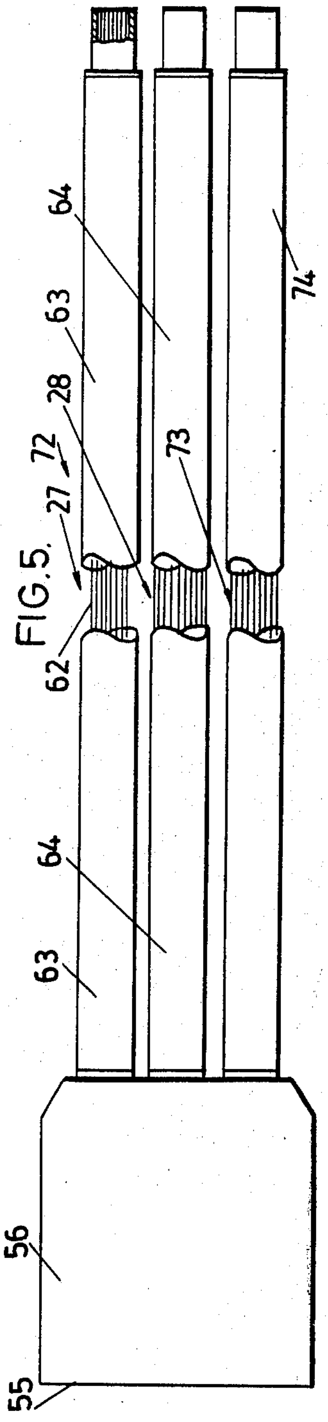
Figure 6:
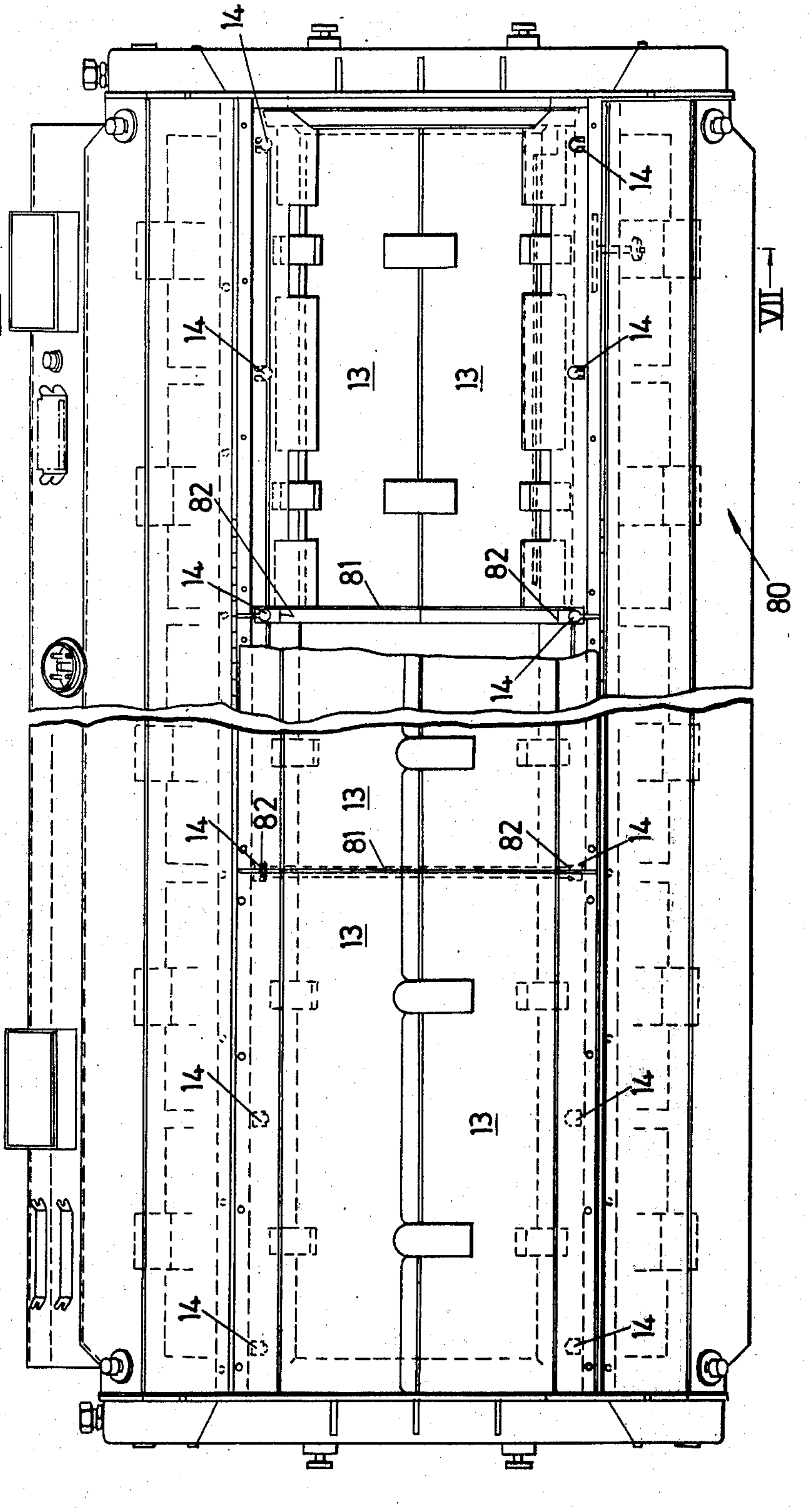
Figure 7:
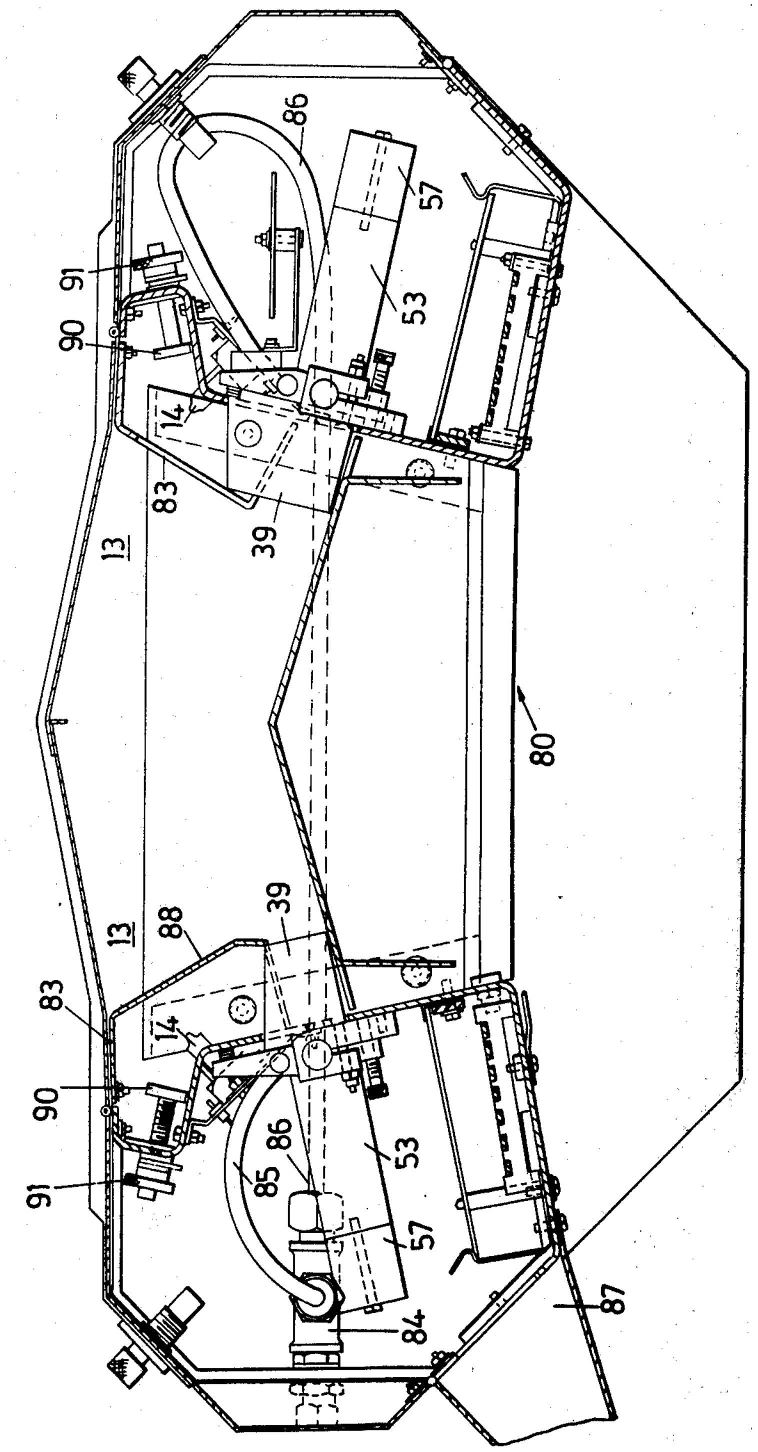
Figure 8:
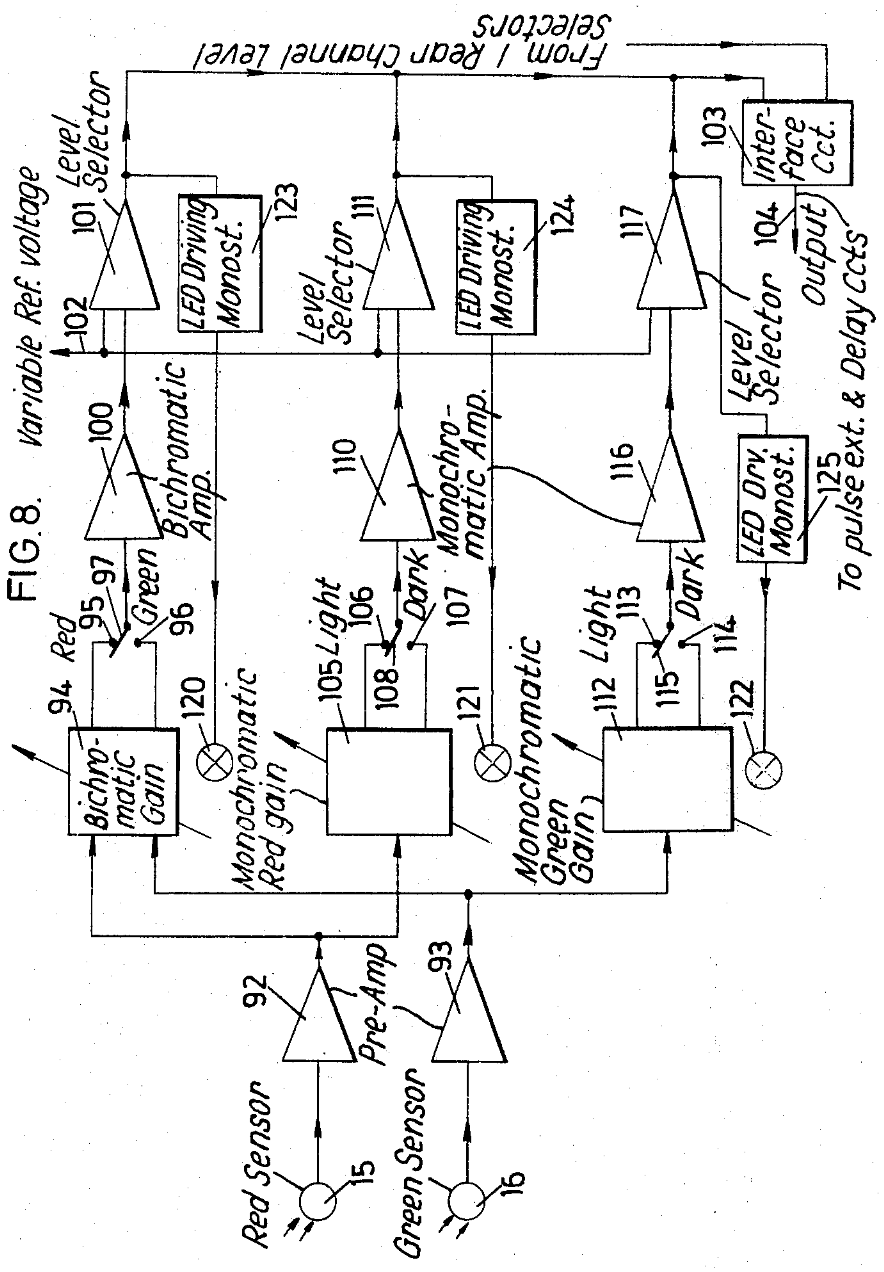

The invention is illustrated, merely by way of example, in the accompanying drawings, in which:

FIG. 1 is a diagrammatic sketch of a sorting machine incorporating a light-splitter device according to the present invention, FIG. 2 is an exploded view of a part of the sorting machine which incorporates the said light-splitter device, FIG. 3 is an end view of the light splitter device, a portion thereof being shown in FIG. 3A on a magnified scale, FIG. 4 is a plan view of the light-splitter device, FIG. 5 is a plan view similar to FIG. 4 but illustrating a modified light splitter device, FIG. 6 is a plan view of an optical unit for use in the sorting machine shown in FIG. 1, FIG. 7 is a sectional view taken on the line VII—VII of FIG. 6, and FIG. 8 is a circuit diagram of a part of the sorting machine.

Referring first to FIG. 1, a bichromatic colour sorting machine comprises six hoppers 10 (only one shown) from which material 11 to be sorted, e.g. peas or beans, may pass to a respective chute 12 from which they may fall freely through one of six sorting channels 13 of the machine. It will of course be appreciated that feeding devices other than the hoppers 10 and chutes 12 may be used if desired.

As the material 11 falls through a channel 13, visible light from lamps 14 (only one of which is shown in FIG. 1) falls on the material 11 and the light reflected therefrom, or transmitted therethrough, is viewed by a pair of light sensors 15, 16, e.g. photocells or photomultipliers.

The sensors 15, 16 also view light which is reflected from a plurality of backgrounds 17 (only one shown) which are selected to reflect the same average intensity of visible light (so far as the light sensors 15, 16 are concerned) as the material 11 itself, the backgrounds 17 being employed as a convenient way of eliminating the influence of the size of the material 11 upon the amount of visible light received by the respective light sensor 11. Each background 17, in addition to being illuminated with visible light, from the lamps 14, is also illuminated with infra-red light (or other light of a colour to which the light sensors 15, 16 are not responsive) from an infra-red lamp 18.

Although only one such pair of light sensors 15, 16 is shown in FIG. 2, it is preferred to use at least two such pairs disposed at opposite sides of each channel 13.

The light sensors 15, 16 are respectively provided with different coloured filters 20, 21 so that one of the light sensors of each pair is sensitive to visible light of one particular colour (e.g. red) reflected by or transmitted through the material 11, while the other light sensor of the pair is sensitive to visible light of a different colour (e.g. green) reflected by or transmitted through the material 11.

The visible light received by the light sensors 15, 16 from the material 11 is transmitted by way of a lens device 25 onto a light splitter device 26 which is provided with two groups 27, 28 of optical fibres which extend respectively to and may conform to the shape of the filters 20, 21.

The outputs of the light sensors 15, 16 are connected across a difference amplifier 30 the output of which in turn controls an electronic comparator 31 which is adapted to distinguish desired from undesired material 11.

When undesired material 11 falling through a channel 13 is detected by the comparator 31, an output signal is transmitted therefrom to an electrically controlled ejector device 32. Compressed air is delivered to the ejector device 32 by way of a line 33 and, as a result of the said output signal, a valve (not shown) is opened so that air is allowed to escape as a jet from a nozzle 34 forming part of the device 32. As a result, the undesired material 11 is ejected.

Light from the lens system 25 is also directed by way of an infra-red transmitting filter 35 to a datum control light sensor, 36, e.g. a photocell or photo-multiplier which is responsive to infra-red light reflected from a background 17, the datum control light sensor 36 being connected by way of a circuit 37 to the electronic comparator 31. Since the amount of infra-red light received by the datum control light sensor 36 will depend upon whether there is material 11 in the field of view in front of the background 17, the datum control light sensor 36 is adpated to detect the presence or absence of the material 11 in the sorting zone within the channel 13. The circuit 37 ensures that the datum with respect to which the comparator 31 discriminates between desired and undesired material 11 does not change in the course of a sorting operation. A suitable circuit 37 is shown in FIG. 7 of British Pat. No. 885,287.

As shown in FIG. 2, the lens device 25 includes a block 39 which houses lens systems 40, 41. The lens system 40 successively comprises a lens protection glass 42, a lens retaining ring 43, a convex lens 44, an O-ring seal 45 and a spacer member 46. The lens system 41 successively comprises a lens protection glass 50, a lens retaining ring 51, and an achromatic lens 52. The light passing through the lens system 41 passes through a spacer block 53 and is thus focussed onto a surface 55 of the light splitter device 26.

As shown in FIGS. 3 and 4, the light splitter device 26 comprises a block 56 which is mounted within a block 57 (FIG. 2). The block 56 has a rectangular recess 58 therein which extends to one side of the block 56 and which is partially closed by a closure piece 60 so as to leave a space 61 therein (the dimensions of which may, for example, be 2 mm × 15 mm.).

Mounted in the space 61 are a multiplicity of optical fibres 62 adjacent ends of which extend from the said surface 55 which lies in the same plane as an end surface of the block 56. The lens system 25 is arranged to focus light from the material 11 onto the common surface 55. The ends of the fibres 62 remote from the surface 55 are arranged in the said groups 27, 28 which are respectively housed in metal or other tubes 63, 64. The optical fibres 62 have a thin layer of lower refractive index material which is provided about a core of higher refractive index material, providing for almost 100% of total internal reflection.

The fibres of each of the groups 27, 28 respectively extend from regions distributed substantially uniformly throughout the surface 55. This may for example be done, as indicated in FIG. 3A, by arranging that, at the surface 55, the adjacent ends of the fibres 62 of the two groups 27, 28 are arranged in, say, 10 alternate layers 65, 66 respectively. Thus, for example, all the layers 65 may be connected to the fibres of the group 27, while all the layers 66 may be connected to the fibres of the group 28.

Provided, therefore, that there are a sufficient number of layers 65, 66 which are similar to each other, and provided the fibres of each of the groups 27, 28 have the same total cross-sectional area, the amount of light received from material 11 by the fibres of the group 27 will be exactly the same as the amount of light received by the fibres of the group 28. In this case it has been assumed that the light sensors 15, 16 require to receive equal amounts of light, but if in fact they require to receive unequal amounts, this can easily be catered for, e.g. by arranging that there are more layers 65 than layers 66, or vice versa, or arranging that the number of optical fibres in the layers 65, 66 is not identical, or arranging that the cross-sectional areas of the fibres of the groups 27, 28 are not identical.

The more layers that are provided in the light splitter device 26 the better, since otherwise pulsating signals are produced as the object "enters" one layer after another. However, provided that the frequency of such pulsation is higher than the frequency at which sorting is being effected, this is not of importance.

Another way in which the same effect may be achieved, is to arrange that each part of the surface 55, which constitutes a common end surface of all the fibres 62, contains fibres 62 of the groups 27, 28 in the same relative proportions, e.g. in equal proportions. This may be achieved by causing some of the fibres 62 in each part of the common surface 55 to pass through one or other of the tubes 63, 64 randomly, so that each part of the surface contains a random distribution of the fibres of each of the groups 27, 28.

If filters 20, 21 are not employed, the fibres of the groups 27, 28 may extend right up to the light sensors 15, 16 and may be shaped so as to conform closely thereto. For example the light sensors 15, 16 may be constituted by photo-diodes which are rectangular or circular in shape. If such photo-diodes are small, the shaping of the fibres to conform to the shape of the photo-diodes is of considerable importance.

The light which has passed through the lens system 40 passes through the filter 35, which is mounted between a pair of filter retaining rings 67, and through an apertured plate 68 so as to pass to the datum control light sensor 36 which is constituted by a photo-diode. The filter 35, filter retaining rings 67 and apertured plate 68 are mounted in a block 69. The signals from the datum control light sensor 36 are transmitted to the circuit 37 which is mounted on a circuit board 70, the circuit board 70 being mounted on a bracket 71. As indicated above, the circuit 37 may correspond to that shown in FIG. 7 of British Pat. No. 885,287.

This arrangement enables the datum control to be effected by parts which are disposed immediately adjacent to the light splitter device. Since the machine has six adjacent channels, such a disposition of the datum control is highly convenient.

The light splitter device 26 of the present invention ensures that each of the light sensors 15, 16 views the same material 11 at the same time and receives an equal (or some other predetermined proportion) of light therefrom.

Moreover, the light splitter device 26 of the present invention is less fragile than those previously suggested, as well as having a higher light efficiency because of the use of the optical fibres. Furthermore, because of this high light efficiency, even though small lenses are used, these lenses can "spare" some light for the datum control light sensor 36 without causing an unsatisfactory signal to noise problem.

In FIG. 5 there is shown a modified light splitter device 72 which is generally similar to the light splitter device 26 and which for this reason will not be described in detail, like reference numerals indicating like parts.

In the case of the light splitter device 72, however, the optical fibres 62 which extend from the common surface 55 are divided into three groups, namely the groups 27, 28 which extend through the tubes 63, 64 and so to the light sensors 15, 16 and a group 73 of additional fibres which extend through a metal or other tube 74 and so to the filter 35. The FIG. 5 construction thus has the merit of enabling one to dispense with the lens system 40.

The fibres of the group of fibres 73 may be disposed, at the common surface 55, in layers (not shown) which alternate regularly with the layers 65, 66 of the groups 27, 28. Alternatively, at the common surface 55, the optical fibres of the groups 27, 28, 73 may be randomly distributed in equal or other proportions so that the optical fibres of each group occur substantially uniformly throughout all parts of the common surface.

Another possibility is that the group 73 is derived from two layers of optical fibres which are arranged at opposite ends respectively of the common surface 55. For example, at the common surface 55, in addition to the layer 65, 66 shown in FIG. 3A, a further two layers may be disposed respectively on opposite sides of the assembly of layers 65, 66, and the optical fibres therefrom may be passed through the tube 74. If the layers are provided at the top and bottom of the common surface 55, material 11 entering the sorting zone will operate the datum control as soon as it enters the sorting zone and will continue to do so until it leaves the sorting zone.

The arrangement shown in FIG. 5 is also usable in trichromatic sorting, in which case the group 73, instead of extending to the filter 35, would extend to a further light sensor (not shown) which, like the light sensors 15, 16, would be connected across the difference amplifier 30.

In fact, as will be appreciated, the light splitter device of the present invention may be provided with any desired number of groups of fibres.

As mentioned above, the machine has six sorting channels 13 and, as shown in FIGS. 6 and 7, these are provided in a chamber 80 of an optical unit. The chamber 80 has three longitudinally aligned adjacent pairs of intercommunicating channels 13 through whic may fall the material 11 to be sorted. Each pair of intercommunicating channels 13 is separated from the adjacent pair thereof by a transversely extending partition wall 81. Each channel of each said pair is provided, along its edge remote from the other channel of the pair, with three lamps 14. Thus some of the light from the lamps 14 of each channel of each pair is directed into the other channel of the pair.

Each of the channels 13 is provided adjacent the or each respective partition wall 81 with a lamp 14 which constitutes one of the three lamps of the channel mentioned above and which is mounted in a cut-away portion 82 of the partition wall 81. Thus each of the lamps 14 which is disposed in a cut-away portion 82 serves to illuminate the channels of two adjacent pairs of channels.

In short, each channel 13 is illuminated (a) by a lamp or lamps 14 disposed wholly within it, (b) by a lamp or lamps 14 disposed in the interconnecting channel 13 arranged transversely of it, and (c) by the two lamps 14 provided in the cut-out portions 82 at opposite ends of the adjacent partition wall 81. It will be seen that the construction shown in FIG. 6 permits the required degree of illumination to be achieved with the use of only fourteen lamps 14. These give a balanced illumination in the chamber 80 and therefore ensure that the material 11 being sorted does not have highlights and dark areas.

Each of the lamps 14 is constituted by a 24 watt quartz-iodine lamp which is a long life incandescent lamp providing an intense light with a good infra-red content.

The quartz-iodine lamps 14 have a very high light-producing efficiency and this is of considerable importance in the case of the present invention. Thus, by reason of the face that the light splitter device 26 employs optical fibres, it is essential to ensure that the light directed onto the common surface 55 of the light-splitter device 26 extends normal to the common surface 55 or at a small angle (not exceeding 30°) to this normal, since if this angle is exceeded the required total internal reflection will not occur within the fibres. This means that the lens 52 must be made fairly small if one is to avoid having a long lens tube and correspondingly large and expensive common surface 55. The smaller the lens 52, however, the greater is the amount of light which must be directed onto it if the required signal to noise ratio is to be maintained at the light sensors 15, 16. The quartz-iodine lamps 14, which provide a high intensity of illumination, therefore permit the use of a small lens 52 and in turn permit the use of the optical fibres of the light splitter device 26.

Mounted over each of the quartz iodine lamps 14 is a loose lamp shield 83 which is made of a transparent plastics material such as a polycarbonate material sold under the Trade Mark "MAKROLON". This shield has a frosted portion 88 which may be formed by scratching the surface of the shield 83 and which serves to prevent the material 11 from receiving direct light from the quartz-iodine lamps 14.

Since the light shields 83 are loose fitting, the quartz-iodine lamps 14 will not be sealed from their respective channels 13. However, such sealing is not of importance because the quartz-iodine lamps 14 operate at such a high temperature (about 300° to 400° C) that the dust produced in the sorting of many articles will be burned off, i.e. vaporised, if it settles on the lamps 14.

Means (not shown) may be provided such that if a lamp 14 burns out, the power supply is not adversely affected.

As will be seen from FIG. 7, the axes of the lens systems 41 in the blocks 39 through which viewing is effected are substantially aligned in the horizontal plane. This is of importance since other arrangements will involve the risk that either the top or the bottom of the material 11 being viewed will not be viewed adequately as it falls through the sorting zone. This substantially horizontal arrangement is rendered possible by virtue of the fact that the axes of each lens system 40 and datum control light sensor 36 are disposed at only a small angle to each other.

The optical unit 80 is provided, for each pair of intercommunicating channels 13, with an air nozzle 84 which is adapted to be connected to a source of compressed air (not shown). Air from the nozzle 84 is continuously or periodically blown past the lenses of the lens systems 40, 41, and past the lens 35, so as either to prevent dust from settling thereon or so as to remove dust which has so settled. The compressed air from the nozzle 84 is passed to the adjacent lenses through a nylon or other tube 85 and is passed to the lenses of the companion channel 13 by way of a nylon or other tube 86. Air may also be introduced, for cleaning the whole chamber 80, through an air inlet 87.

The centre-line of each lens system 41, which is mounted in the respective block 39, is aligned with a background support member 90. Each member 90 is adapted to support a background 17. As will be seen, the background 17 supported by each background support member 90 is disposed adjacent to a lamp 14 so as to be illuminated thereby. The distance between the background 17 and the respective lamp 14 may be adjusted by means of a control knob 91. Thus the intensity of the reflection from the backgrounds 17 can be considerably adjusted and this makes it substantially easier to select the correct backgrounds, i.e. to match the backgrounds with the material being sorted.

Referring now to FIG. 8, there is provided, for each viewing direction of each of the channels 13, a light sensor 15 which is responsive to, say, red light, and a light sensor 16 which is responsive to, say, green light. The light sensors 15, 16 are respectively connected by way of preamplifiers 92, 93 to terminals of a common variable bichromatic gain device 94 which corresponds to the difference amplifier 30 of FIG. 1. The bichromatic gain device 94 has "red" and "green" output terminals 95, 96 which may be alternately contacted by a switch 97, so that when the switch 97 is in contact with the terminal 95 positive-going signals are transmitted to a bichromatic amplifier 100, while when the switch 97 contacts the terminal 96, negative-going signals are transmitted to the bichromatic amplifier 100. The bichromatic amplifier 100 is connected to a level selector 101 which corresponds to the comparator 31 of FIG. 1, and which has a variable reference voltage from a line 102 applied thereto. The output from the level selector 101 passes to an interface circuit 103 the output 104 from which passes by way of pulse extension and delay circuits (not shown) so as to effect operation of the ejector device 32. The interface circuit 103 matched the impedance of the level selector 101 to that of the said pulse extension and delay circuits.

Thus when the switch 97 is in contact with the red contact 95, any output signals from the level selector 101 will occur as a result of the detection of material 11 which reflects light more in the red than in the green part of the spectrum, and this material will be ejected by virture of the pulse sent to the ejector device 32. Similarly, when the switch 97 contacts the green contact 96, then material 11 which reflects light more in the green than in the red part of the spectrum will be ejected by the ejector device 32.

The pre-amplifier 92 of the red light sensor 15, in addition to being connected to the bichromatic gain device 94, is also connected to a variable monochromatic red gain device 105 to which the "green" light sensor 16 is not connected. The device 105 constitutes a difference amplifier which compares the signal from a pre-amplifier 92 with a standard signal from a source (not shown), positive-going output signals from the device 105 reaching a "light" contact 106, and negative-going signals from the device 105 reaching a "dark" terminal 107. A switch 108 is alternately contactable with the light terminal 106 or the dark terminal 107 so that the signals may be transmitted to a monochromatic amplifier 110, and thus to a level selector 111 which receives the variable reference voltage from the line 102.

The level selector 111 is connected to the interface circuit 103 and consequently, when the switch 108 is in the position shown in which it contacts the light contact 106, material 11 which is unduly light in the red part of the spectrum will be rejected by the ejector device 32, while when the switch 108 is in contact with the dark contact 107, material 11 which is unduly dark in the red part of the spectrum will be ejected by the ejector device 32.

The pre-amplifier 93, in addition to being connected to the variable bichromatic gain device 94, is also connected to a variable monochromatic green gain device 112, to which the red light sensor 15 is not connected. The device 112 constitutes a difference amplifier which compares the signal from the pre-amplifier 93 with a standard signal from a source (not shown). The positive and negative going outputs from the device 112 are taken respectively to a light contact 113 and a dark contact 114. A switch 115 is adapted to be brought alternately into contact with the light contact 113 or the dark contact 114. The switch 115 is connected to a monochromatic amplifier 116 which is in turn connected to a level selector 117 which receives the variable voltage from the line 102. Thus, according to whether the switch 115 contacts the light contact 113 or the dark contact 114, material 11 whose colour in the green part of the spectrum is unduly light or dark respectively will be rejected by the ejector device 32.

The level selectors 101, 111 and 117 are respectively connected on their output sides to solid state indicator lamps 120, 121, 122, by way of driving monostable devices 123, 124 and 125. The arrangement is such that whenever a level selector 101, 111 or 117 sends a rejection signal to the ejector device 32 the respective lamp 120, 121, 122, will emit a flash of light.

Since there are two viewing directions for each channel, and there are six channels 13, there are in all 36 such solid state lamps 120–2. These lamps are situated at the front or rear of the machine and are not covered by any cover so that they may be directly viewed at all times from the exterior of the machine.

Accordingly, the machine may be adjusted by viewing the various lamps 120, 121, and 122 and adjusting the gains of the devices 94, 105, 112, so that, as indicated by the manner in which the various lamps 120, 121, 122 flash, desired output signals are obtained from the level selectors 101, 111, 117 to ensure that the machine circuits are properly balanced and that rejection of faulty material is not being effected, say, solely by output signals from the level detector 111.

That is to say, in setting up the machine it is necessary to ensure that each of the sensors 15, 16, and the circuitry between these sensors and the ejector device 32 is operating appropriately. In a single channel monochromatic machine, this may be judged merely by listening to the operation of the ejector device, but in a multi-channel machine such as that of the present invention, such listening could only be effected at the rate of one channel a time, since the noise from the other channels would make it impossible to judge what was occurring in any specific channel.

Moreover, even in a single channel bichromatic machine, although one could judge the rejection rate by listening, it would be necessary successively to operate the machine monochromatically in each colour and bichromatically, and this would have to be done for each viewing direction.

With the arrangement shown in FIG. 8, however, the frequency at which the lamps 120–2 of the two opposite directions are operating can be adjusted so as to make sure that they are balanced.

Furthermore, if one of the light sensors 15, 16 breaks down during actual operation of the machine, or some other fault occurs in the electrical circuitry, this will be shown by the failure of one of the lamps 120, 121 to flash at the frequency which one would expect.

I claim:

1. A light-sensitive sorting machine having at least one channel through which material to be sorted may pass, there being provided for each said channel means for illuminating material passing through the channel, a plurality of light sensors for receiving light from the material passing through the channel, a plurality of comparators adapted to distinguish signals derived from desired and undesired material, each light sensor being connected to and being adapted to pass signals to at least one of the comparators to distinguish signals derived from desired and undesired material, each comparator producing an output signal whenever undesired material is detected by one of said light sensors, and an indicator means coupled to each comparator, directly viewable from the exterior of the machine, for discretely indicating whenever each comparator produces an output signal.

2. A light-sensitive sorting machine comprising a plurality of light sensors which are respectively responsive to light of different colours emanating from material moving through a field of view, a block, a multiplicity of optical fibres which extend through said block and adjacent ends of which extend from a common surface of said block, the opposite ends of the fibres being disposed outwardly of said block in a plurality of separate groups of fibres which respectively illuminate the light sensors responsive to the light of different colours, and focussing means for focussing light onto the common surface, the fibres of each group respectively extending from a multiplicity of spaced apart regions distributed substantially uniformly throughout the said common surface, the ratio of the amounts of light received by the different light sensors being independent of the position of the material in the field of view.

3. A sorting machine as claimed in claim 2 in which, at the common surface, the adjacent ends of the fibres of the various groups are arranged in layers, each group of fibres comprising a plurality of such layers which alternate with the layers of the other group or groups of fibres.

4. A sorting machine as claimed in claim 2 in which the machine has at least one sorting channel which is provided with at least one of said light sensors, the light sensor being arranged to pass signals to a respective comparator adapted to distinguish signals derived from desired and undesired material being sorted, the comparator producing an output signal whenever undesired material is detected by said light sensor.

5. A sorting machine as claimed in claim 4 in which another of said light sensors is constituted by a datum control light sensor which is adapted to detect the presence of said material in a sorting zone of the sorting machine, the datum control light sensor being connected to the respective comparator by a circuit which ensures that the datum with respect to which the respective comparator discriminates between desired and undesired material does not change in the course of a sorting operation.

6. A sorting machine as claimed in claim 4 in which the machine is provided with a plurality of adjacent channels through which may pass material to be sorted, at least one individual lamp being mounted within each channel to illuminate the latter, and at least one further lamp being disposed at a junction between adjacent channels to illuminate each of the latter.

7. A sorting machine as claimed in claim 6 in which the machine has a plurality of pairs of intercommunicating channels each intercommunicating channel of which contains at least one respective lamp some of the light from which is directed into the other intercommunication channel, each pair of intercommunicating channels being separated from the adjacent said pair by a partition each of the opposite ends of which is partially cut away to house a said further lamp.

8. A sorting machine as claimed in claim 4 in which the comparator is connected to an indicator means for visually indicating whenever the comparator produces an output signal.

9. A sorting machine as claimed in claim 8 in which the material passing through the said sorting channel is viewed from at least one viewing direction, there being provided, for each viewing direction, two light sensors which are respectively sensitive to light of different colours and which are respectively arranged to pass signals to three said comparators, two of the comparators being monochromatic comparators which receive signals only from a respective one of said light sensors, and the other comparator being a bichromatic comparator which receives signals from both said light sensors, each comparator being connected to a respective indicator means.

10. A sorting machine as claimed in claim 8 in which the indicator means comprises a lamp which is directly viewable from the exterior of the machine.

11. A sorting machine as claimed in claim 4 in which additional optical fibres are provided one end of each of which is disposed at said common surface and the other end of each of which is arranged to illuminate a datum control light sensor which is adapted to detect the presence of said material in a sorting zone of the sorting machine and which is connected to the comparator by a circuit which ensures that the datum with respect to which the respective comparator discriminates between desired and undesired material does not change in the course of a sorting operation.

12. A sorting machine as claimed in claim 11 in which there are two groups of additional optical fibres which extend from opposite sides respectively of the said common surface.

13. A sorting machine as claimed in claim 4 in which the machine is provided with at least one channel through which may pass material to be sorted, the channel being illuminated by at least one quartz-iodine lamp which is open to the interior of the respective channel and the light from which is directed onto the material being sorted, the said light being directed by said focusing means onto the said common surface.

* * * * *